Dec. 2, 1969  M. W. PRESTON ET AL  3,481,009
SEAT BELT BUCKLE
Filed July 13, 1967
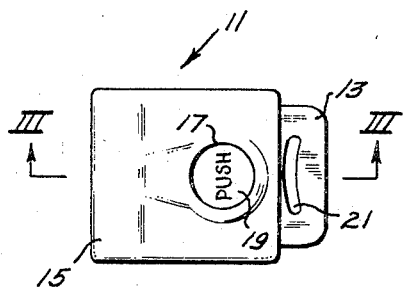
FIG. 1
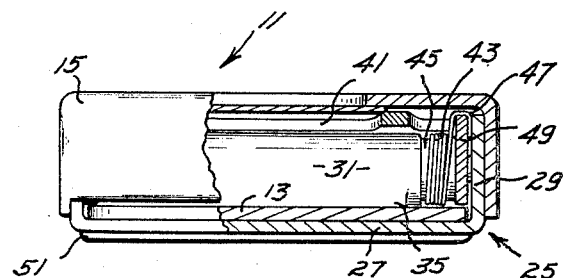
FIG. 2
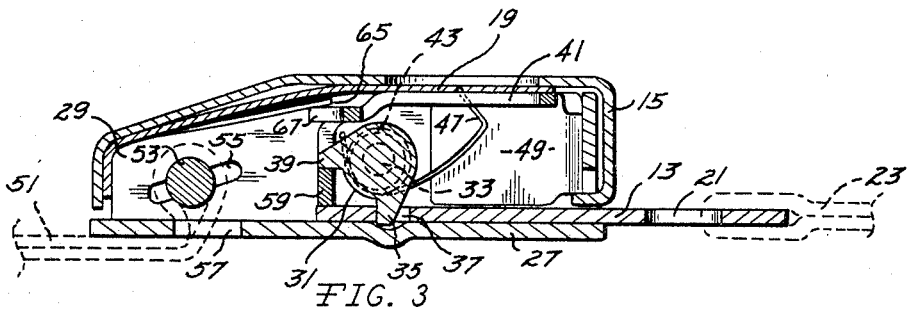
FIG. 3
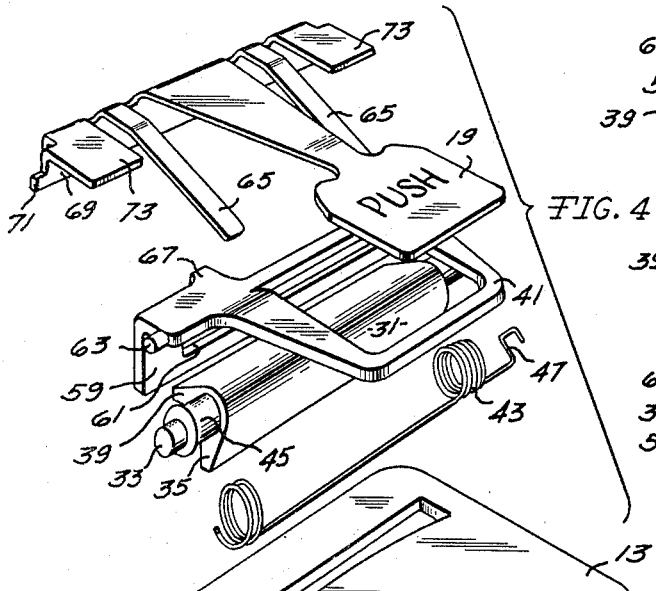
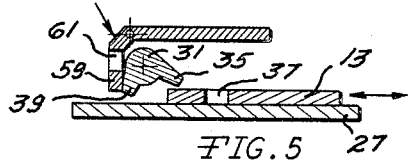
FIG. 5
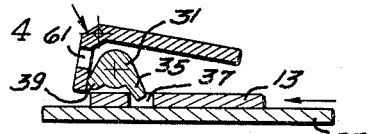
FIG. 6
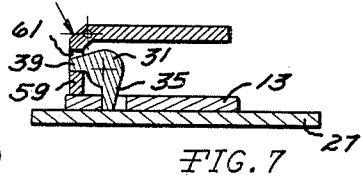
FIG. 7
INVENTORS
JAMES T. LIGON
MARVIN W. PRESTON
BY
Miller Morris Pappas & McLeod
ATTORNEYS

United States Patent Office 3,481,009
Patented Dec. 2, 1969

3,481,009
SEAT BELT BUCKLE
Marvin W. Preston, Royal Oak, and James T. Ligon, Almont, Mich., assignors to The Firestone Tire & Rubber Company, Akron, Ohio, a corporation of Ohio
Filed July 13, 1967, Ser. No. 653,099
Int. Cl. A44b *19/00*
U.S. Cl. 24—230                                     4 Claims

ABSTRACT OF THE DISCLOSURE

A seat belt buckle with one belt attached to a latch mechanism and the other terminating in a latch engaging tongue. The tongue is insertable into the latch mechanism and automatically engages therewith when manually urged thereinto. A rotary latch is normally biased into an open or tongue receiving orientation. The rotary latch is pivoted from a main frame and includes two detent portions one of which is rotatably urged by the leading edge of the inserting tongue into a catch element. At the same time the other detent is rotated into a latch portion of the tongue to restrain the tongue against disengagement from the main frame. The catch element is normally biased toward positive engagement with the rotary latch, while the rotary latch is normally biased toward an open or tongue receiving orientation. This latter biasing also gives a positive separting thrust to the tongue when released by a manual push button.

SUMMARY OF INVENTION

Due to the recent and rapid advance of safety features in the fields of automotive engineering, seat belts have come to be well known. This art is confronted with a multitude of problems including, among others, the development of satisfactory buckling mechanisms for belts which will operate easily and reliably, and yet remain fastened under the severe impact loads for which they are intended.

It is considered desirable that these buckles be of small size and light weight and yet not introduce execessive cost in their manufacture. This is especially true in the extremely competitive automobile manufacturer's supply businesses which are under constant and relentless pressure from the auto manufacturers to improve their standards and specifications while at the same time reducing the cost.

Seat belt buckles should be releasable with a minimum of effort even under a loaded condition. Preferably such belts should be operable by one hand alone, so as to leave the other hand free for driving. Buckles of this type should be tamper proof, resist crushing forces, and at the same time not require tight manufacturing tolerances. They should be easy to assemble with a minimum number of parts and/or fasteners; and the engagement of the belt tongue to the latching apparatus should take place smoothly and not depend on a nice fitting of many parts.

It is also advantageous to transfer impact forces through the strongest portions of the buckling apparatus, while reducing the variety of load types which must be withstood by the release lever of the buckle, or the other weaker components thereof.

Consequently it is an object of the present invention to provide a seat belt buckle having a rotary latch structure which rotates into latching engagement with the tongue portion of the buckle, rather than flexing into engagement therewith.

It is another object of this invention to provide a seat belt buckle which can be released with very little effort, and by one hand only, even when loaded.

It is another object of this invention to provide a seat belt buckle which is easy to assemble, having a minimum number of parts and no fasteners.

It is still another object of the present invention to provide a tamper proof seat buckle.

It is still another object of the present invention to introduce a seat belt buckle which can be manufactured without conformance to extremely tight tolerances.

Still another object of the present invention is to teach a latch-tongue engagement which does not depend on the fit of many parts.

Still another object of the present invention is to introduce a seat belt buckle in which the forces are transferred from latch to tongue at the strongest part of the main frame or base of the buckle, namely at the center thereof.

Still another object of the present invention is to introduce a buckle release lever which does not receive seat belt loading forces.

Yet another object of the present invention is to provide a single spring element which simultaneously returns the release lever to the normal stop position (as when the buckle is locked, or the buckle is ready to receive the tongue) serves as a push button, and resists unlatching force.

Other objects will be apparent to those skilled in the art upon reading the present description, drawings and claims.

In the drawings:

FIGURE 1 is a top plan view of the rotary latch buckle with the cover attached and the tongue in the engaged position.

FIGURE 2 is a partly broken away front elevation view of the rotary latch buckle of the present invention showing the belt tongue, rotary latch and catch lever all assembled within the cover, in the buckled orientation.

FIGURE 3 is a section view of FIGURE 1 taken on the lines III—III, showing the rotary latch with double detents, one of which is engaged in the tongue and the other engaged with the catch lever.

FIGURE 4 is an exploded view of the seat buckle of the present invention, showing the rotary latch and its biasing spring, and also the lever catch with its release arm portion disposed under the manual operator.

FIGURE 5 is a section view of the seat belt of the present invention taken on the longitudinal center line thereof, and being the first of a sequence of three operational views.

FIGURE 6 is a sectional view the same as FIGURE 5, being the second of a sequence of three operational views, with the tongue partially inserted into the frame to actuate the rotary latch and engage one detent thereof into the latch portion of the tongue.

FIGURE 7 is a view similar to FIGURES 5 and 6, being the third in the three view sequence, and showing the tongue completely inserted and the rotary latch engaged in the catch lever portion.

DESCRIPTION OF A PREFERRED EMBODIMENT

In FIGURE 1 is seen the seat belt buckle 11 of the present invention. Tongue 13 is inserted for engagement with the frame portion of the unit, this engagement being concealed underneath the ornamental cover 15. Opening 17 is provided in the cover for access to the push button (marked "Push") 19. The slot 21 in the tongue 13 is provided for attachment to a seat belt 23 as seen in FIGURE 3.

FIGURE 2 views the structure from the vantage point of a belt tongue being inserted for buckling engagement and shows the cover partially broken away. The central support member for the entire apparatus is the channel-form main frame 25, with bottom 27 and parallel side walls 29 (only one of which is seen in FIGURE 2).

Tongue 13 is guidably inserted between the side walls 29 of the main frame and in generally parallel overlying relation to the bottom 27 thereof. A forged rotary latch member 31 extends transversely between the walls 29 and is pivotally suspended therefrom. The journalling of the rotary latch 31 is achieved by pin portions 33 (best seen in FIGURE 4) which are inserted in openings provided therefor in the main frame walls 29. The latch 31 is shown in FIGURE 2 rotated downwardly with a first detent portion 35 thereof engaged in the latch opening, or latch portion, of the tongue 13. FIGURE 3 also shows the first, or tongue, detent 35 engaged with the tongue latch aperture 37, to hold the tongue from de-insertion or disengagement from the main frame.

Belt 51 is looped over a circular, knurled, retaining bar having a circular cross section 53. The retaining bar has flat ear extensions at each end (not shown) which slide in the slots 55 in each side wall of the main frame 25. The looped belt 51 extends downwardly through the aperture 57 in the bottom 27 of the main frame 25. Under loading the belt 51 draws the retention bar 53 rearwardly to engage an increased surface area of the belt against the surface of the bar 53 thus to frictionally resist loosening or slipping of the belt. Unloading allows the bar 53 to trip forward in the slot 55 and the belt 51 then may be slid around the bar 53 so as to permit tightening or loosening of the belt. This feature is presently known to the belting trade.

The configuration in FIGURE 3 shows the buckle in the locked situation. The tongue 13 is restrained against outward movement, i.e., disengagement, by the tongue detent 35. To release the tongue 13 requires rotation of the latch 31 so that detent 35 may rotate upwardly out of the latch aperture 37. Such rotation cannot take place, however, because the second, or catch detent 39 of the rotary latch 31 is restrained by its engagement with the locking aperture 61 on the catch lever 59. The detent 39 is released by depressing the catch lever arm 41 which rotates the catch lever 59 on pins 63 (seen only in FIGURE 4) so as to disengage the catch detent 39 from the catch lever. The spring 43 then pivotally urges the rotary catch in a counter-clockwise direction whereby detent 35 kicks the tongue 13 away from the buckle frame and thus gives a positive separating action. This positive separation of the buckle and tongue makes possible an effortless manual release of the buckle requiring only one hand to depress lever 41. The other hand is not necessary to pull the tongue away from the buckle and thus remains free for steering the automobile. At the same time the bias spring 43 maintains detent 35 in an upward orientation to give clearance for reinsertion of tongue 13 when it is desired to rebuckle the mechanism (see FIGURE 5).

The catch lever 59 is seen to form an approximate right angle member with its actuator arm portion 41, and is pivoted near the apex of the angle to the side walls 29 of the main frame 25. The catch is restrained against disengaging rotation by resilient biasing elements or fingers 65 each of which presses downwardly on a detent portion 67 on the rotary catch 59 (see FIGURES 3 and 4). The fingers 65 are integral extensions from the manual operator element 19, which has an elongated base portion 69 with an ear 71 and tab 73, at each end. Both the ears 71 and tabs 73 are compressed in sandwich fashion between the side walls of the main frame and the cover, which is fitted thereto. The ears 71 are each engaged in a notch (not shown) at the rear of each side wall 29. The tabs 73 lie flatly on the tops of the frame walls 29, near the rear portions thereof, between the wall and cover, this relation however not being directly shown in the figures.

OPERATION

It can be seen that under loading, the tongue 13 is subject to an outward force which tends to rotate the rotary catch detent 35 in a counterclockwise direction; but such motion is prevented by the catch 59 with which the detent 39 is interferingly engaged. The loads encountered are absorbed by short members, e.g., the detents 35 and 39, and the catch lever 59, which therefore reduces the bending moments or couples encountered under load. Moreover, the detent 39 is blocked against counterrotation by a pure compression force in the catch 59, since under load the tongue 13 attempts to rotate the catch detent downwardly against the tongue. Thus the catch 59 is compressed forming a positive block against counterrotation of the latch. The pressure of detent 39 against the tongue 13 serves to frictionally resist its withdrawal from the frame, and also pins it down against the bottom of the frame thereby giving an anti-rattle advantage. The force absorbing elements 35 and 39 are so short that they may be, and are, formed quite thick, without a significant weight increase. The increased thickness gives greatly increased failure strengths, a characteristic essential to the very nature of the seat belt utilization.

It should be further noted that the pull-apart forces on the buckle mechanism are transmitted from the tongue to the frame via rotary latch rotation pins 33 which are positioned at the strongest point of the main frame, i.e., in the middle thereof.

Release of the mechanism is accomplished by depressing lever 41 under actuation by the push operator 19, which subsequently springs back against the cover 15. Engagement or disengagement of the tongue from the buckle frame can best be appreciated by the sequence represented in FIGURES 5 through 7. The only elements shown are the catch lever 59, the rotary latch 31, the tongue 13 and the bottom wall 27 of the main frame. The somewhat schematic presentation facilitates understanding of the operation of the device.

FIGURE 5 shows the tongue in a position which could be entering or leaving the buckle frame, and these two motions are shown by the double arrow. Presuming the tongue to be entering the frame for engagement therewith, FIGURE 6 shows the next step in the sequence, with the tongue passing underneath the detent 35 to engage detent 39 and urge it upwardly into rotating contact with the latch 59. The catch 59 is counter biased against this rotation at all times by the fingers 65, this force being shown near the pivot point by the angled arrow in all three FIGURES 5 through 7. As previously described the fingers 65 of the manual operator press downwardly against the detents 67 of the latch. FIGURE 6 shows also that the detent 35 has not rotated downwardly into engagement with the tongue aperture 37. Further rotation of the latch 31, from this point onward, is accomplished by the inward moving tongue 13 urging against the detent 35, which has now rotated downwardly into engagement with the latch aperture 37 on the tongue. The detent 39 is no longer in contact with the tongue but rather has become associated with the catch lever 59. Final rotation of the latch carries the detent 39 into engagement with the aperture 61 of the catch 59, as seen in FIGURE 7. This is precisely the normally locked orientation as shown in structural detail at FIGURE 3. The catch 59 is held in this engaged, or buckled, orientation by the fingers 65 biasing the catch as already indicated by the arrow in FIGURE 7.

It should be noted that in all FIGURES 5 through 7 the rotary latch 31 is similarly biased in the counterclockwise or open, tongue receiving orientation by the spring 43 which is shown only in FIGURES 2, 3 and 4. The spring 43 as seen in FIGURES 3 and 4 is anchored to the frame 25 at one end 47 and is looped over the shoulders 45 of the latch 31 and the intermediate straight portion acts as a complementing opening bias against the detent portion 25. Thus when the manual operator is depressed to rotate lever 41 and release the catch mechanism, the spring imparts a counterclockwise, or return, rotation to the latch thereby "kicking" the tongue free of the frame. Thus only one hand motion is needed (on the push button) to release and separate, i.e., completely unbuckle, the structure.

From this presentation of an operative embodiment of our invention, improvements, modifications and substitutions will become apparent to those skilled in the art. Such improvements, modifications and substitutions are intended to be included within the spirit of the invention.

We claim:

1. A belt connecting mechanism comprising:

a channelform frame member connected to one belt end, and having a bottom plate and parallel side walls extending upwardly from opposite edges thereof;

a connecting tongue connected to another belt end and insertable between the walls of said frame slidably over said bottom plate, said tongue having a latch aperture adjacent the leading edge thereof;

rotary catch means mounted pivotally between said walls of said frame, removed from the slide path of said tongue and pivotally biased to a blocking position;

rotary latch means mounted pivotally between said walls of said frame and having first and second detent portions extending away from the pivot axis of said latch, and pivotally biased in unlatched condition to have said second detent rotated away from said bottom plate so that upon said insertion of said tongue said leading edge of said tongue clears between said frame bottom plate and said second detent, displacing said first detent to rotate said rotary latch, and correspondingly rotate said second detent of said rotary latch toward said frame bottom plate and into said tongue latch aperture, whereby further tongue insertion effects further rotation of said latch so that said first detent of said latch moves into rotationally blocked engagement with said catch, consequently locking said belt tongue to said frame;

release means for counter-bias rotation of said rotary catch, to disengage said first latch detent therefrom so that said tongue may be withdrawn from said frame.

2. A buckling mechanism for safety belts comprising:

a channelform frame and including a bottom and side walls having a portion at one end connectable to a belt;

a tongue element connectable to a separate part of said belt and insertably slidably in said channel between said sides and in flat engagement with said bottom of said channel and including a lock slot therethrough;

a rotary catch element pivotally connected between said walls of said channel and having a pair of extending detent protuberances, one of said protuberances in an interference path of said tongue element and rotatable thereby upon insertion of said tongue and pivoting the other of said protuberances into said lock slot of said tongue; and a block bar actuator separately pivoted between said side walls of said channelform frame and including a portion tilting beneath said first detent protuberance and into effective engagement with said tongue and urging said tongue into engagement with said bottom channelform member whereby said tongue is prevented from withdrawal until said portion of said block bar is tilted out from beneath said first detent protuberance.

3. The apparatus of claim 2 and including a spring bias means urging said block bar actuator toward engagement beneath said first detent protuberance, and said spring bias means upon movement of said actuator urging release movement of said tongue.

4. The apparatus of claim 3 and including an apertured cover secured over said frame whereby access may be had to said actuator to overcome said spring bias means, tilt said actuator out of blocking engagement and urge release of said tongue element.

References Cited

UNITED STATES PATENTS

| 1,253,455 | 1/1918 | Adams. |
| 2,863,200 | 12/1958 | Miller. |
| 2,970,796 | 2/1961 | Ross. |

FOREIGN PATENTS

| 39,179 | 1/1907 | Switzerland. |

BERNARD A. GELAK, Primary Examiner